United States Patent [19]

Nishikawa

[11] Patent Number: 4,763,922
[45] Date of Patent: Aug. 16, 1988

[54] AXLE SUPPORTING ROD FOR MOTOR VEHICLE

[75] Inventor: Akihiko Nishikawa, Yokohama, Japan

[73] Assignee: NHK Spring Co., Ltd., Yokohama, Japan

[21] Appl. No.: 20,231

[22] Filed: Feb. 27, 1987

Related U.S. Application Data

[63] Continuation of Ser. No. 757,661, Jul. 22, 1985, abandoned.

[30] Foreign Application Priority Data

| Jul. 31, 1984 | [JP] | Japan | 59-159334 |
| Aug. 30, 1984 | [JP] | Japan | 59-181041 |
| Sep. 26, 1984 | [JP] | Japan | 59-201344 |

[51] Int. Cl.⁴ .................... B60G 19/02; B21D 39/04
[52] U.S. Cl. ................... 280/689; 285/382; 29/517
[58] Field of Search ............. 29/521, 517; 285/382, 285/382.1, 382.2; 403/284, 285, 274, 265, 266, 267, 298; 280/689, 721; 267/154

[56] References Cited

U.S. PATENT DOCUMENTS

| 1,166,738 | 7/1914 | Bayton | 29/517 |
| 1,179,853 | 8/1914 | McCulloch | 29/517 |
| 1,693,839 | 12/1928 | Faudi | 29/517 |
| 1,823,158 | 9/1931 | Mogford et al. | 29/521 |
| 1,911,775 | 5/1933 | Smith | 285/382.2 |
| 2,147,343 | 2/1939 | Hokanson | 29/521 |
| 3,477,750 | 11/1969 | Powell | 285/382 |
| 3,556,567 | 1/1971 | O'Connor | 285/382 |
| 4,231,555 | 11/1980 | Saito | 267/154 |
| 4,357,990 | 11/1982 | Melnyk | 285/382 |
| 4,365,824 | 12/1982 | Ohno et al. | 280/689 |
| 4,378,122 | 3/1983 | Ohno et al. | 280/689 |

FOREIGN PATENT DOCUMENTS

| 55-153207 | 11/1980 | Japan . |
| 58-149257 | 10/1983 | Japan . |
| 670176 | 4/1952 | United Kingdom . |
| 1524617 | 9/1978 | United Kingdom . |
| 2023253A | 12/1979 | United Kingdom . |

Primary Examiner—John J. Love
Assistant Examiner—Karin L. Ferriter
Attorney, Agent, or Firm—Frishauf, Holtz, Goodman & Woodward

[57] ABSTRACT

A steel rod body is fixedly fitted, at its end, with a metallic coupling member manufactured independently of the rod body. A solid section having a free end is formed either at the end of the rod body or the coupling member, while a tube section having an opening at its end is provided on the corresponding end of either the rod body or the coupling member. Circumferential and axial grooves are formed on the outer peripheral surface of the solid section. At least the free end of the solid section is inserted into the opening of the tube section, and the tube section is crimped by means of dies. Thus, part of the metal material of the tube section creeps into indentations on the solid section so that the tube section and the solid section are firmly linked together for integration. A waterproof sealant is provided either on an inner surface of the tube section or on an outer surface of the solid section.

12 Claims, 5 Drawing Sheets

AXLE SUPPORTING ROD FOR MOTOR VEHICLE

This application is a continuation of application Ser. No. 757,661, filed July 22, 1985, now abandoned.

BACKGROUND OF THE INVENTION

The present invention relates to axle supporting rods, such as radius rods and stabilizers, used in suspension systems of motor vehicles.

Stabilizers are generally used as a type of axle supporting rods for stabilizing the posture of the body of motor vehicles in rolling motion.

A conventional stabilizer is a rod bent in a predetermined shape, and consisting of a torsion section and a pair of arm sections extending the ends of the torsion section. When is used in a motor vehicle, the torsion section is positioned extending in the transverse direction of the vehicle, while the arm sections are coupled at their free ends to a pair of suspension systems of the vehicle.

In a typical prior art example, the free ends of the arm sections are flattened and have a fitting hole.

The ends of the conventional stabilizer can be shaped with relative ease by forging or the like. In a stabilizer of this type, however, the ends are restricted to a uniform shape and cannot be varied. Therefore, the stabilizer is not adaptable to a variety of suspension systems.

In a prior art stabilizer of another type, coupling members, manufactured independently of the arm sections, are welded to the end of the arm sections. Although this stabilizer can be fitted with coupling members of various shapes, it is subject to the following drawbacks.

In welding the coupling members to the arm sections, rapid heating or cooling of welds will cause various malfunctions. In order to avoid this, it is absolutely necessary to perform both preheating and postheating before and after welding Thus, welding the coupling members requires many processes and facilities, resulting in an increase in cost.

These days, in particular, stabilizers tend to be used under severe stress conditions. Accordingly, spring steel with a high carbon equivalent is commonly used as a material for the stabilizers. Welding the spring steel, however, involves several problems. The aforesaid preheating and postheating would, for example, require precise control of temperature and time.

Stabilizers of yet another type have a function as tension rods, in addition to their primary function as stabilizers.

The body of stabilizers of this type is selected to tension on its arm sections, as well as both bending and torsional moment. Each arm section has a thread formed at its end whereby the arm section is coupled to the suspension system.

Stabilizers these days tend to be hollow for reduced motor vehicle weight and economy of resources. Hollow stabilizers, however, have not yet been put to practical use as stabilizers doubling as tension rods. One of the reasons for this is that even though pipes can be used for the torsion section and arm sections in view of their mechanical strength, no effective or reliable coupling means for connecting the stabilizer body and the coupling members at the ends of the body has yet been developed.

In a prior art system disclosed in Japanese Utility Model Publication No. 55-153207, solid coupling members are fixed to a hollow stabilizer body by fitting the former into the ends of the latter. In this case, however, the coupling members are limited in fixing strength and are not very high in reliability. Accordingly, conventional stabilizers are integrally formed from a solid material, having thread portions at their ends. In this case, however, the stabilizer body is heavy in weight. Also, the stabilizer body and the thread portions are integral with one another so that it is difficult to form the thread by rolling. Thus, threading inevitably requires cutting work, resulting in increased cost.

The stabilizer doubling as a tension rod is expected to have an accurate length in the longitudinal direction of the motor vehicle. If the stabilizer body is formed integrally with the portions, however, it is impossible to correct distortion caused by heat treatment. It is, therefore, difficult for the stabilizer body to have specified dimensions.

Prior art radius rods will now be described. Radius rods are rods which serve to determine the longitudinal position of an axle, and to counter torque produced at the time of acceleration or deceleration of a motor vehicle. See JASO (Japanese Automobile Standards Organization), 3006 radius rod systems.

Most of the prior art radius rods are straight and low in working stress. Conventionally, therefore, carbon steel for mechanical structures (equivalent to S30C provided by Japanese Industrial Standards), or other low-carbon steel is frequently used as a material for the radius rods. Where low-carbon steel is used for radius rods, the rod-shaped radius rod body can be welded to the coupling members without any problem.

Recently, however, there has been an increasing demand for radius rods whose bodies are partially bent for reasons of accomodating the layout of particular suspension systems.

Radius rods of this type are used under severer stress conditions than straight radius rods. Consequently, the use of low-carbon steel for their material provides insufficient strength. Thus, it is necessary to use spring steel to form the radius rod, treating the spring steel with heat for higher tensile strength.

However, because of its high carbon equivalent, the spring steel cannot easily be welded, as in the case of the radius rods described above.

SUMMARY OF THE INVENTION

The object of the present invention is to provide a radius rod or stabilizer which can be very reliably linked to coupling members, without being welded thereto.

Another object of the invention is to provide a hollow or solid radius rod or stabilizer free of the drawbacks inherent in the conventional solid radius rod or stabilizer.

According to this invention, there is provided an axle supporting rod for a motor vehicle comprising a metallic rod body, and a metallic coupling member fixed to the end of the rod body. The axle supporting rod is characterized by further comprising a solid section and a tube section. The solid section is integrally formed with either the end of rod body or the end of the coupling member, and has indentations in its outer periphery. The tube section is integrally formed with the end of the rod body when the solid section is integrally formed with the end of the coupling member, or with the end of the coupling member when the solid section is integrally formed with the end of the rod body a waterproof sealant is provided either on an inner surface of the tube section or on an outer surface of the solid section. At least the free end of the solid section is inserted in the tube section. The tube section is pressed, and part of this section protrudes into the indentations of the solid section. As a result, the solid section is securely fastened to the tube section.

DETAILED DESCRIPTION OF THE PREFERRED EMBODIMENTS

Preferred embodiments of the present invention applied to radius rods will now be described.

Figure 1:
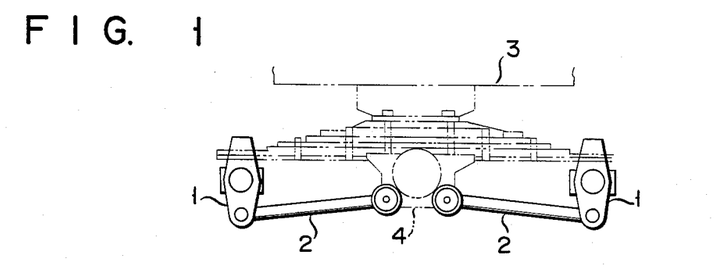
FIG. 1 is a side view of a suspension system fitted with radius rods.
Figure 2:
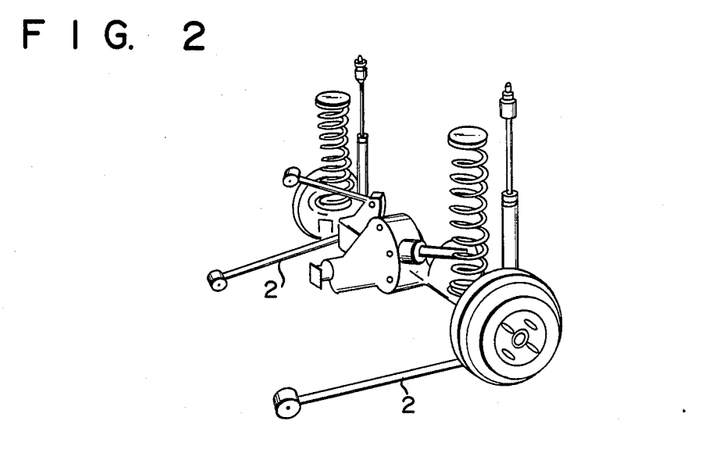
FIG. 2 is a perspective view of another suspension system fitted with radius rods of another type.

FIG. 1 shows an example of radius rods for a large-sized motor truck. Members 1 on the axle side are supported on a member 4 on the side of a body frame 3 by means of radius rods 2. FIG. 2 shows an example of radius rods for a passenger car.

Figure 3:
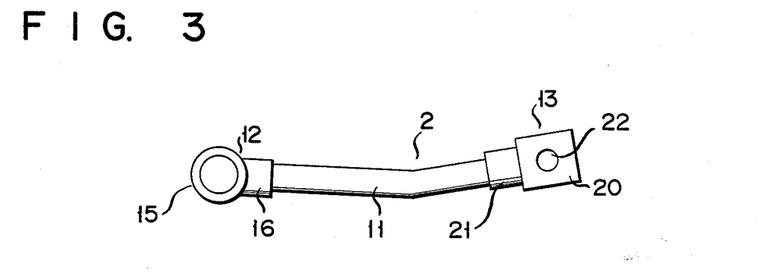
FIG. 3 is a side view of a radius rod according to one embodiment of the present invention.

A radius rod 2 according to one embodiment of the present invention, as shown in FIG. 3, comprises both a radius rod body 11 extending in the longitudinal direction of a motor vehicle, and coupling members 12 and 13 attached to either end of the radius rod body 11. The radius rod body 11 is a round rod made of spring steel. The coupling members 12 and 13 are also made of steel.

The coupling member 12 is formed of a cylindrical eye section 15, and a cylindrical tube section 16 coupled to the eye section 15 by welding or pressure welding.

The coupling member 13 consists of a U-shaped leg section 20 and a cylindrical tube section 21 connected to the section 20 by welding, pressure welding or caulking. The section 21 has a fitting hole 22 at one end.

Figure 4:
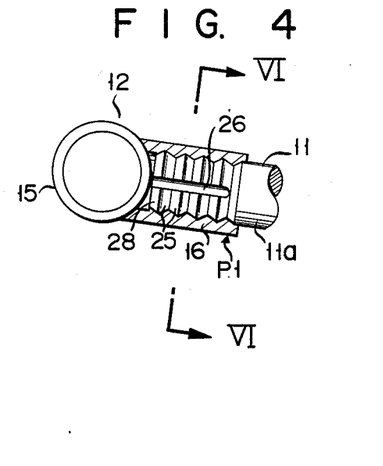
FIG. 4 is a side view, partially in section, illustrating one coupling member shown in FIG. 3.

The coupling member 12 and the radius rod body 11 are connected as shown in FIG. 4. The body 11 has a solid portion 11a with a free end. The free end of the portion 11a is inserted into the opening of the tube section 16. The body 11 is either a solid rod or a pipe. When it is a solid rod, its one end forms the portion 11a. When it is a pipe, its one end is subjected to plastic processing, e.g., upsetting, to thereby form the solid portion 11a.

Indentations 25 are formed in the outer periphery of the solid portion 11a. These indentations are circumferential grooves formed by rolling. Further, three grooves 26, for example, are cut in the outer periphery of the portion 11a. They extend in the axial direction of the portion 11a and are positioned at angular intervals of 120°. They serve to secure the portion 11a to any other member, thus preventing the portion 11a from rotating. For ease of insertion of the free end of the portion 11a into the tube section 16, it is desired that the edge 28 of the extreme end of the portion 11a be chamfered or tapered.

Figure 6:
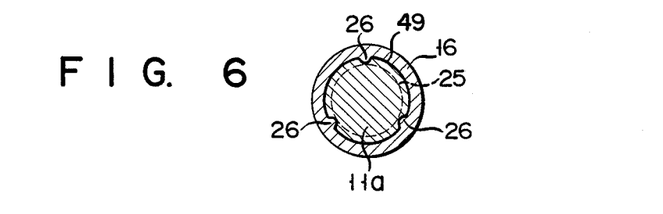
FIG. 6 is a sectional view of the radius rod taken along line VI—VI, of FIG. 4.

With the solid portion 11a held in the tube section 16, the arrangement is set into a die assembly in which the tube section 16 is crimped for the purpose of plastic processing. By doing this, part of the metal of the tube section 16 produces a plastic flow so that the tube section 16 and the solid portion 11a are firmly linked together for integration, as shown in FIG. 6. More specifically, part of the metal on the inner surface of the tube section 16 protrudes and fills the indentations 25 and the grooves 26, producing a plastic flow. Thus, the coupling member 12 is prevented from moving in either the axial direction of the radius rod body 11, by the circumferential indentations 25, or in the circumferential direction, by the grooves 26.

An endurance test was conducted on a prototype based on the embodiment described above. The results of the test are as follows. Axial tension fracture load was found to be 10,850 kgf. A repetitive axial tension test indicated that the prototype remained intact after 1,000,000 trials at ±320 kgf, and after 500,000 trials at ±3,000 kgf. Torsional fracture torque was 45 kgfm. These figures represent, entirely, the practical application of the invention.

If a resistance-welded pipe is used for the tube section 16, a bead weld will be formed on the inner surface of the tube section 16, extending in the axial direction thereof. If the tube section 16 is crimped with the bead weld arranged in the grooves 26, part of the metal (weld bead) of the tube section 16 will bite into the grooves 26.

Thus, rotation of the coupling member 12 can more securely be prevented.

Figure 5:
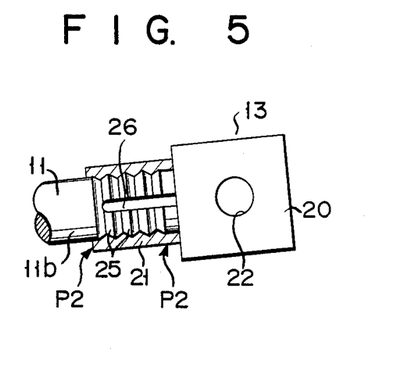
FIG. 5 is a side view, partially in section, illustrating the other coupling member shown in FIG. 3.

The other coupling member 13 is connected in substantially the same manner as the coupling member 12. As shown in FIG. 5, circumferential indentations 25 and axial grooves 26 are formed beforehand on the solid portion 11b at the other end of the radius rod body 11. After the solid portion 11b is inserted in the tube section 21, the tube section 21 is crimped.

Again, if a resistance-welded pipe is used for the tube section 21, the coupling member 13 may also be more securely prevented from rotating, as a bead weld on the inner surface of the tube section 21 will protrude into the grooves 26, as aforesaid, particularly so when the tube section 21 is crimped.

According to the radius rod 2 constructed in this manner, the radius rod body 11 and the coupling members 12 and 13, at the ends thereof, can be securely linked together without being welded. Thus, even if the materials of the radius rod body 11 and the coupling members 12 and 13 are high in carbon equivalent, they can be effectively coupled to form a high-reliability radius rod. It is, therefore, possible to apply, practically, materials with high carbon equivalent, such as spring steel, and, hence, to provide a radius rod of high tensile strength.

Further, preheating and postheating, which are essential to welding, can be omitted to permit simplification of equipment and processes.

Since the tube sections 16 and 21 can be crimped after treating the radius rod body 11 with heat, the coupling members 12 and 13 will never be deformed by the effect of the heat treatment. Thus, the radius rod 2 can be finished accurately without requiring a correcting process.

Instead of the groove-shaped indentations 25, a plurality of circular, oblong or elliptical indentations may be formed on the outer peripheral surface of the solid portions 11a and 11b. As part of the metal of the tube sections 16 and 21 projects into these indentations by plastic flow, the tube sections 16 and 21 are prevented both from moving axially and from rotating.

Figure 7:
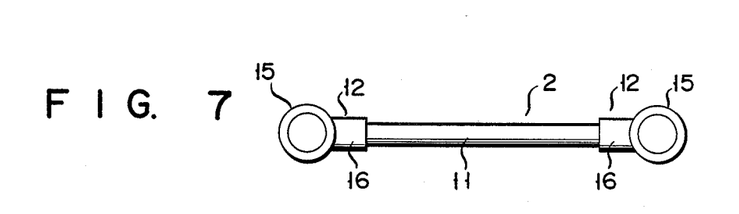
FIG. 7 is a side view of a radius rod according to another embodiment of the invention.

As shown in FIG. 7, moreover, coupling members 12 of the same shape may be coupled to either end of the radius rod body 11 in the same manner as the example of FIG. 4.

Alternatively, coupling members 13 of the same shape as the one shown in FIG. 5 may be attached to either end of the radius rod body 11.

Figure 8:
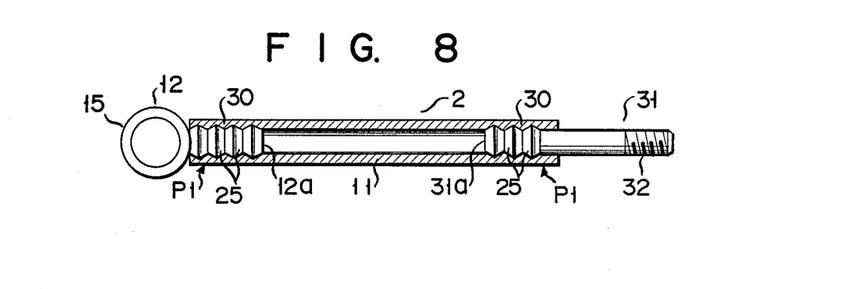
FIG. 8 is a side view, partially in section, showing a radius rod according to still another embodiment of the invention.

In another embodiment shown in FIG. 8, a steel pipe is used as the radius rod body 11. This pipe is open at both ends. In this case, each end of the radius rod body 11 directly constitutes a tube section 30. Both coupling members 12 and 31 are provided with solid portions 12a and 31a, respectively. The solid portions 12a and 31a have respective free ends. The free ends of the solid portions 12a and 31a are inserted into their corresponding tube sections 30, and the tube sections 30 are crimped. As a result, part of the metal of the tube sections creeps into the indentations 25 so that the tube sections 30 and the solid portions 12a and 31a are linked together for integration. The coupling member 31 is rod-shaped and has a thread 32 at its extreme end.

Thus, as in previous embodiments, the embodiment of FIG. 8, the coupling members 12 and 31 can be firmly fixed. Moreover, the radius rod 2 shown in FIG. 8 is light in weight because its body 11 is hollow.

Figures 9, 10, 11:
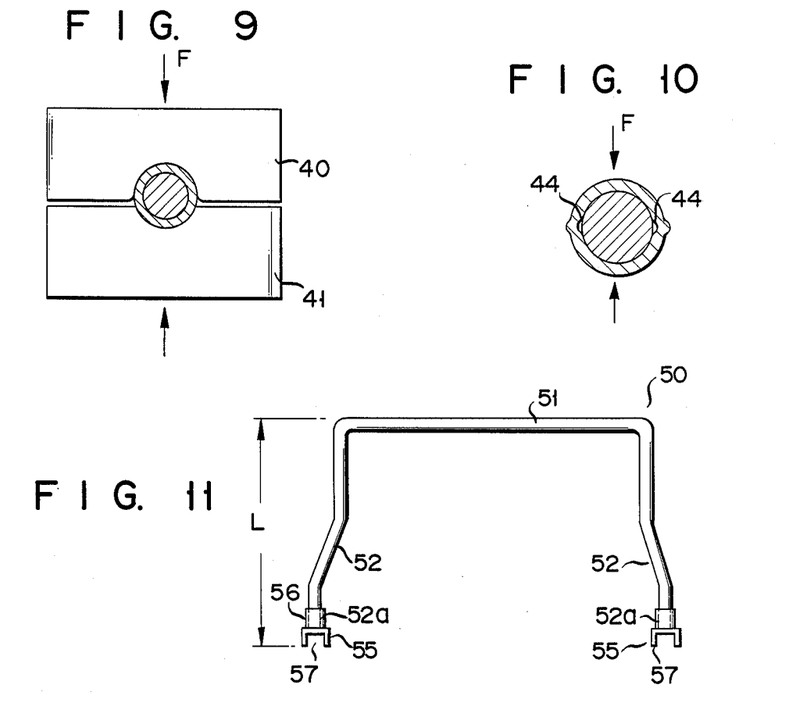
FIG. 9 is a front view showing an example of dies used for crimping.
FIG. 10 is a sectional view of an end of the radius rod crimped by means of the dies shown in FIG. 9.
FIG. 11 is a plan view of a stabilizer according to a further embodiment of the invention.

The crimping or plastic processing is performed using a pair of dies 40 and 41, as shown in FIG. 9. Since the crimping load is generally applied in one direction, some gaps 44 will inevitably be formed in a cross section perpendicular to the loading direction F, as shown in FIG. 10.

The gaps 44 permit penetration of external liquids. If water or other liquids corrosive to metal penetrates the gaps, the inside of the crimped portions may possibly rust.

To prevent rusting, it is advisable to fill the inside of the crimped portions with a sealant 49 (see FIG. 6). This sealant is applied to at least one of the indentations 25 before the plastic processing so as to cover its entire circumferential length. After the application of the sealant, load is exerted on the dies 40 and 41 to thereby link the tube sections and the solid portions together.

Pasty synthetic rubber is suitable for use as the sealant, although other materials may also be used. Regions to be coated with the sealant are indicated by arrow P1 in FIGS. 4 and 8. In the example of FIG. 5, the sealant is applied to two ends, as indicated by arrow P2. In short, the sealant is applied to regions wherein liquids might penetrate such that liquid can be prevented from penetrating.

As shown in FIG. 10, the gaps 44 tend to be narrowest in the loading direction (indicated by arrow F), and widest in the direction perpendicular to the loading direction. During the crimping, therefore, the sealant, uniformly applied in the circumferertial direction before the crushing, flows so that it is thin in the loading direction, filling up the gaps in a direction perpendicular to the loading direction. Thus, the sealant effectively fills the widest gaps to prevent penetration of liquid, providing a rust preventive.

Despite the use of the sealant, the crimped regions still permit contact between the metal materials, thereby ensuring sufficient bonding strength.

Further embodiments of the present invention applied to solid stabilizers will now be described.

The embodiment of FIG. 11, uses a stabilizer body 50. Like a conventional stabilizer body, the body consists of a torsion section 51 and a pair of arm sections 52 connected to the ends of the torsion section 51.

The stabilizer body 51 is formed by bending a metallic solid material, such as spring steel. Thus, the torsion section 51 and the arm sections 52 are solid members. Each arm section 52 has a free end. Two coupling members 55 are connected to the ends 52a of the arm sections 52.

Each coupling member 55 includes a tube section 56 to receive the end 52a of each corresponding arm section 52, and a distal section 57 continuous with the tube section 56. The end of the tube section 56 is open.

Both the tube section 56 and the distal section 57 are made of a metal such as steel. In this emboiment, the distal section 57 is fixed to the tube section 56 by welding. Alternatively, however, the tube section 56 and the distal section 57 may be fixed to each other by any means other than welding, or may be formed integrally.

Figure 12:
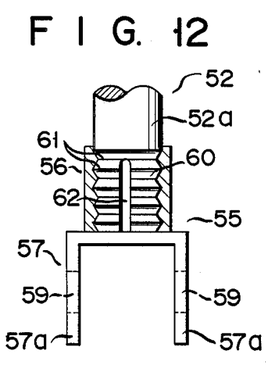
FIG. 12 is a plan view, partially in section, illustrating the end of the stabilizer of FIG. 11.

In an example shown in FIG. 12, the distal section 57 has substantially a U-shaped side view. A pair of legs 57a, facing each other, are each formed with a fitting hole 59. A bolt or other coupling means is inserted into each fitting hole 59 and fixed to the suspension system side.

Meanwhile, indentations 60 are formed beforehand on the outer peripheral surface of the end 52a of the arm section 52. In this embodiment, the indentations 60 include a plurality of circumferential first grooves 61 formed by rolling, and an axial second groove or grooves 62. The grooves 61 and 62 are shaped like shallow V-notches in the section.

After the end portion 52a is inserted into the tube section 56, the tube section 56 is diametrically crimped, reducing its diameter. Thus, the coupling member 55 is linked to the end 52a of the arm section 52 for integration.

According to the arrangement described above, the length of the arm section 52, i.e., the span L in the longitudinal direction of the motor vehicle, can be adjusted by controlling the relative axial position of the coupling member 55 before crimping the tube section 56. Thus, it is possible to deal with distortion of the stabilizer body 50 which may be caused by heat treatment.

Figure 13:
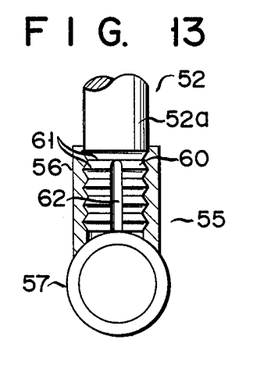
FIG. 13 is a plan view, partially in section, illustrating the end of a stabilizer according to a further embodimnt of the invention.

FIG. 13 shows a stabilizer according to another embodiment of the invention. A distal section 57 of a coupling member 55 of the embodiment is a cylinder extending at right angles to the tube section 56. As regards other components and functions, this stabilizer is similar to the stabilizer described in connection with FIGS. 11 and 12. In FIG. 13, therefore, like reference numerals are used to designate like portions shown in FIGS. 11 and 12.

Figure 14:
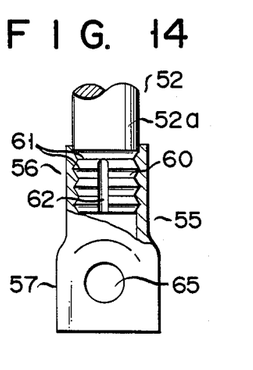
FIG. 14 is a plan view, partially in section, illustrating the end of a stabilizer according to still another embodiment of the invention.

A coupling member 55 of a stabilizer, shown in FIG. 14, is integrally formed from a cylindrical material. The lower half, as illustrated, of a cylindrical metal material is crushed to form a flat distal section 57, leaving a tube section 56 at the upper half portion. The distal section 57 is formed with a fitting hole 65.

Figure 15:
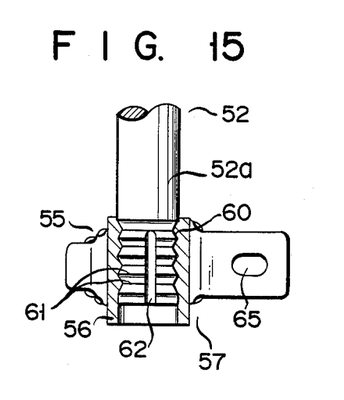
FIG. 15 is a plan view, partially in section, illustrating the end of a stabilizer according to a further embodiment of the invention.

In a coupling member 55 according to still another embodiment shown in FIG. 15, a distal section 57 formed by bending a metal plate is fixed to the outer peripheral surface of a tube section 56. The distal section 57 is formed with a fitting hole 65.

Figure 16:
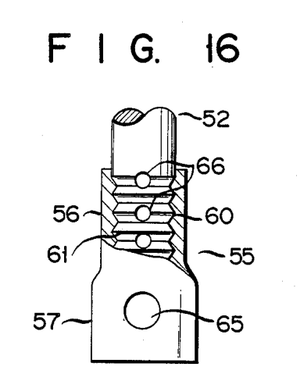
FIG. 16 is a plan view, partially in section, illustrating the end of a stabilizer according to a further embodiment of the invention.

In a further embodiment shown in FIG. 16, a plurality of circular, oblong or elliptical indentations 66 are formed in place of the axial grooves.

As is evident from the embodiments described above, the indentations 60 are not limited to grooves. It is necessary only that the indentations 60 be able to receive part of the metal of the tube sections 56, lest the coupling members 55 rotate relative to the corresponding arm sections 52 of the stabilizer body 50, and slip off in the axial direction thereof.

Referring now to FIGS. 17 to 22, further embodiments of the present invention applied to hollow stabilizers will be described.

Figure 17:
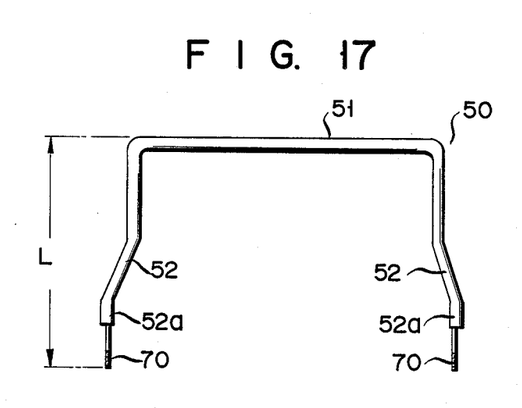
FIG. 17 is a plan view of a stabilizer according to another embodiment of the invention.

A stabilizer body 50, shown in FIG. 17, is formed by bending a metallic pipe, such as resistance-welded pipe, into a predetermined shape. A seamless pipe or other steel pipe may also be used as a material for the stabilizer body 50.

A coupling member 70 made of steel or other metallic solid material is fixed to an end 52a of the arm section 52. The arm section 52 has an opening at its end 52a, thus constituting a tube section.

Figure 18:
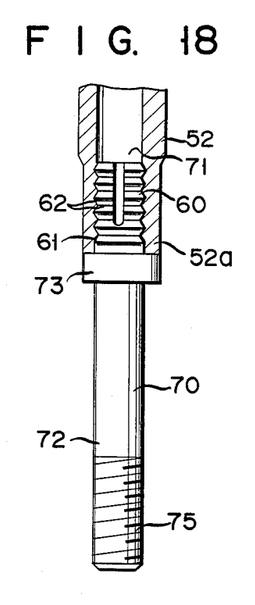
FIG. 18 is a plan view, partially in section, illustrating the end of the stabilizer of FIG. 17.

Each coupling member 70 includes a solid rod-shaped portion 71 for insertion into the end 52a of its corresponding arm section 52, a shaft 72 extending coaxial with the rod-shaped portion 71, and a collar 73 located between the shaft 72 and the rod-shaped portion 71. The rod-shaped portion 71 has a free end. A thread 75 is formed at the distal end of the shaft 72. The thread 75 is coupled to a suspension system (not shown).

Indentations 60 are formed beforehand on the outer peripheral surface of the rod-shaped portion 71 by, for example, rolling. The indentations 60 include a plurality of grooves 61 extending in the circumferential direction of the rod-shaped portion 71, and a groove or grooves 62 extending in the axial direction of the rod-shaped portion 71. It is to be understood that the grooves 61 and 62 may be somewhat inclined against the circumferential or axial direction of the rod-shaped portion 71.

After at least the free end of the rod-shaped portion 71 is inserted into the end 52a of the arm section 52, the end 52a is diametrically crimped by means of dies, as in the case of the embodiment shown in FIG. 9. Thus, the coupling member 70 is fixed to the arm section 52.

Figure 19:
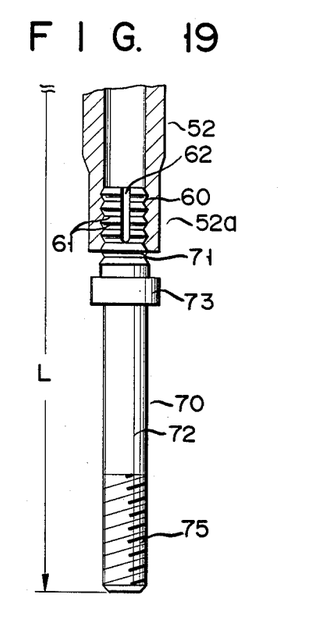
FIG. 19 is a plan view, partially in section, illustrating the end of a stabilizer according to still another embodiment of the invention.

In the hollow stabilizer of this construction, as shown in FIG. 19, that portion of the rod-shaped portion 71 for the indentations 60 is designed to be sufficiently long so that the span L in the longitudinal direction of the motor vehicle can be adjusted by changing the axial position of the coupling member 70 relative to the end 52a, before crimping the end 52a. This arrangement is particularly effective for those stabilizers doubling as a torsion rod.

Moreover, since the coupling member 70 and the stabilizer body 50 can be formed independently, the threading 75 at the distal end of the coupling member 70 can be formed by rolling, permitting a reduction in manufacturing cost.

Also, the threading 75 can undergo rustproof treatment. In the case of the prior art solid stabilizers, even if the thread portions were previously coated with rustproof film, subsequent heat treatment caused the film to peel off. According to the aforementioned hollow stabilizer, however, the stabilizer body 50 and the coupling member 70 can be separately treated with heat so that the threading 75 may previously be treated for rust prevention by, for example, plating.

Since the stabilizer body 50 is hollow, the stabilizer of this embodiment is lighter in weight than the conventional solid stabilizers.

Figure 20:
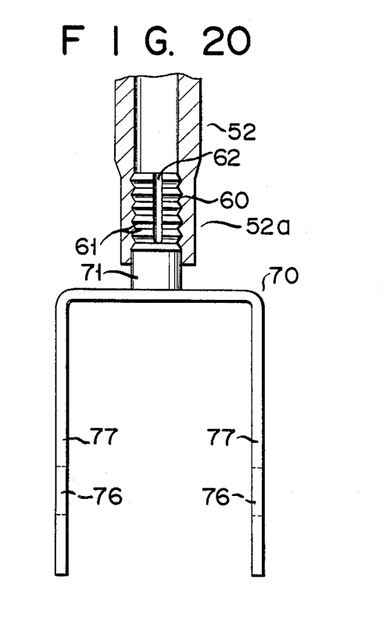
FIG. 20 is a plan view, partially in section, illustrating the end portion of a stabilizer according to a further embodiment of the invention.
Figure 21:
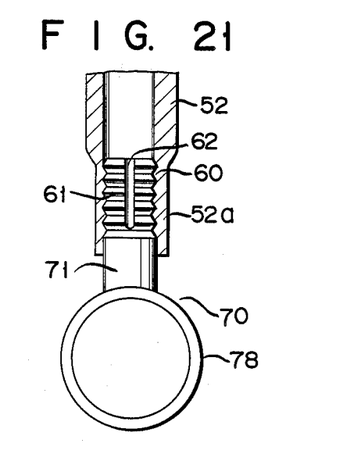
FIG. 21 is a plan view, partially in section, illustrating the end of a stabilizer according to a further embodiment of the invention.

It is to be understood that the present invention may also be applied to regular stabilizers without having the function as a tension rod. FIGS. 20 and 21 show examples of such stabilizers.

A coupling member 70 of the embodiment shown in FIG. 20 has forked legs 77. The coupling member 70 is connected to the suspension system side by means of fitting holes 76 formed individually in the legs 77.

A coupling member 70 shown in FIG. 21 has a tubular distal section 78. The coupling member 70 is connected to the suspension system side by means of the distal section 78. As regards other basic arrangements, the stabilizer of this embodiment is similar to the hollow stabilizer shown in FIG. 18, providing the same functions and effects.

Figure 22:
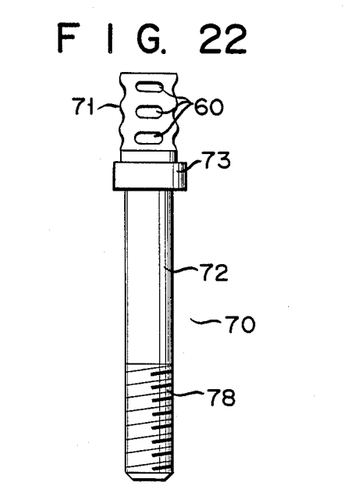
FIG. 22 is a side view of a coupling member according to still another embodiment of the invention.

FIG. 22 shows an example in which hemispherical, oblong or elliptical indentations 60 are formed in place of the grooves.

In any of the stabilizers described above a sealant may be provided, as in the case of the radius rods, between the crushed regions of the tube sections and the solid portions.

What is claimed is:

1. An axle supporting rod for a motor vehicle, comprising:
   a metallic rod body;
   a metallic coupling member formed independently of and fixed to the end of the rod body;

a solid section formed either at the end of the rod body or at the end of the coupling member, and having a free end and an outer periphery, said free end having an end face, the solid section having indentations on its outer periphery an at least one axially extending groove open at the end face;

a tube section formed either at the end of the rod body or at the end of the coupling member, the tube section having an opening at an end portion thereof, said tube section being formed of a resistance-welded pipe having an axially extending bead weld formed on its inner surface;

a waterproof sealant provided on the inner surface of the tube section or on an outer surface of the solid section; and wherein at least a portion of the free end of the solid section is inserted into the opening of the tube section, the length of said inserted portion being longer than said groove, the bead weld of said tube section is positioned in the axially extending groove, and the tube section is crimped so that part of the tube section and the bead weld protrude into the indentations and said groove to thereby link the tube section and the solid section together for integration, said waterproof sealant being flowable so as to fill up and seal gaps formed between said solid section and tube section, thereby preventing penetration of liquid.

2. An axle supporting rod for a motor vehicle according to claim 1, wherein said indentations include a plurality of grooves extending in the circumferential direction of the solid section.

3. An axle supporting rod for a motor vehicle according to claim 2, wherein spring steel is used as a material for the rod body.

4. An axle supporting rod for a motor vehicle according to claim 2, wherein said rod body includes a torsion section extending in the transverse direction of the motor vehicle, and a pair of arm sections continuous with each end of the torsion section so as to extend in the longitudinal direction of the motor vehicle, said torsion section and said arm sections being hollow.

5. An axle supporting rod for a motor vehicle according to claim 2, wherein said waterproof sealant is in at least one of said circumferential grooves of said solid section.

6. An axle supporting rod for a motor vehicle according to claim 5, wherein said waterproof sealant extends completely around the circumference of said at least one groove.

7. An axle supporting rod for a motor vehicle according to claim 6, wherein said waterproof sealant comprises a pasty synthetic rubber.

8. An axle supporting rod for a motor vehicle according to claim 5, wherein said waterproof sealant comprises a pasty synthetic rubber.

9. An axle supporting rod for a motor vehicle according to any one of claim 1 wherein spring steel is used as a material for the rod body.

10. An axle supporting rod for a motor vehicle according to claim 9, wherein said rod body includes a torsion section extending in the transverse direction of the motor vehicle, and a pair of arm sections continuous with each end of the torsion section so as to extend in the longitudinal direction of the motor vehicle, said torsion section and said arm sections being hollow.

11. An axle supporting rod for a motor vehicle according to any one of claim 1, wherein said rod body includes a torsion section extending in the transverse direction of the motor vehicle, and a pair of arm sections continuous with each end of the torsion section so as to extend in the longtudinal direction of the motor vehicle, said torsion section and said arm sections being hollow.

12. An axle supporting rod for a motor vehicle according to claim 11, wherein said coupling member is formed with a rod-shaped shaft having a thread thereon.

* * * * *